United States Patent [19]

Chiba et al.

[11] 3,713,193
[45] Jan. 30, 1973

[54] REFRACTORY POWDER HOT-PRESSING SYSTEM

[75] Inventors: Hiroyuki Chiba, Neyagawa; Hideaki Masuda, Moriguchi; Eiichi Hirota, Sakai, all of Japan

[73] Assignee: Matsushita Electric Industrial Co., Ltd., Osaka, Japan

[22] Filed: Oct. 12, 1970

[21] Appl. No.: 79,871

[30] Foreign Application Priority Data

Oct. 21, 1969 Japan .............................. 44/84524

[52] U.S. Cl. ............... 25/132, 25/135, 25/142 R, 25/142 M, 264/332
[51] Int. Cl. .................................................. F27b 9/02
[58] Field of Search .......................... 25/142 M, 142 D, 135 Z, 142 F, 132, 142 R, 134; 264/332; 18/16.5, 16.7

[56] References Cited

UNITED STATES PATENTS

| | | | |
|---|---|---|---|
| 3,303,533 | 2/1967 | King | 18/16.5 X |
| 3,557,414 | 1/1971 | Alliegro | 18/16.5 X |
| 3,309,186 | 3/1967 | Pietsch | 264/332 X |
| 2,125,588 | 8/1938 | Ridgway | 25/142 F |
| 1,524,362 | 1/1925 | McIntosh | 25/132 X |

FOREIGN PATENTS OR APPLICATIONS 516,858   1/1931   Germany .............................. 25/142 F

*Primary Examiner*—J. Spencer Overholser
*Assistant Examiner*—Ben D. Tobor
*Attorney*—Wenderoth, Lind & Ponack

[57] ABSTRACT

A system for hot-pressing refractory powders into dense sintered bodies comprises a tunnel type furnace having a given temperature distribution therein, a plurality of die assemblies each of which has a refractory powder sandwiched between an upper punch and a lower punch thereof, a plurality of supporters for said plurality of dies. At least one pressing means is positioned at a given position in the tunnel type furnace to be at a given temperature. Means are provided for conveying said supporters intermittently one by one from an inlet of said tunnel type furnace through said at least one pressing means to an outlet of said tunnel type furnace, whereby the refractory powder in each of said die assemblies is hot-pressed into a dense sintered body by said at least one pressing means and the dense sintered bodies are conveyed to said outlet. The equipment is suitable for mass-production of hot-pressed bodies of materials such as ferrites and ferroelectric oxides.

8 Claims, 3 Drawing Figures

HIROYUKI CHIBA,
HIDEAKI MASUDA and
EIICHI HIROTA,

INVENTORs

HIROYUKI CHIBA,
HIDEAKI MASUDA and
EIICHI HIROTA,
INVENTORS

BY *Wendroth, Lind & Ponack*
ATTORNEYS

REFRACTORY POWDER HOT-PRESSING SYSTEM

BACKGROUND OF THE INVENTION

This invention relates to a system for hot-pressing refractory powders into dense sintered bodies. More particularly, the invention relates to an improved hot-pressing system suitable for the mass-production of dense sintered bodies.

Heretofore, refractory powders such as oxides, nitrides, carbides or mixtures thereof, were hot-pressed by using a system comprising hot-pressing dies, pressing means and a furnace. The refractory powder was heated in the dies up to an elevated temperature, hot-pressed into a dense sintered body and thereafter, cooled to room temperature.

Such prior hot-pressing system is, however, capable of producing only one pressed body during a single cycle which took a long period of time. Therefore, such systems are unsuitable for the mass-production of hot-pressed bodies. of Hot-press sintering is a well-known method for producing a dense sintered body having a controlled microstructure, a low porosity and fine or large grains. Thus, it is necessary to adjust the hot-pressing operating conditions such as heating temperature, time period and magnitude of pressure. Therefore, a suitable hot-pressing system must be capable fo controlling these hot-pressing operating conditions.

Especially, in the hot-pressing of a magnetic oxide such as ferrite, these conditions must be carefully controlled to obtain a sintered ferrite body having both low porosity and excellent electro-magnetic properties.

OBJECTS AND BRIEF DESCRIPTION OF THE INVENTION

It is an object of the present invention to provide a novel hot-pressing system for the mass-production of dense sintered bodies by hot-pressing refractory powder.

It is another object of the present invention to provide a novel hot-pressing system capable of controlling hot-pressing operating conditions.

A further object of the present invention is to provide a novel hot-pressing system capable of hot-pressing a magnetic oxide such as ferrite materials.

A still further object of the present invention is to provide a novel system capable of hot-pressing ferroelectric oxide materials, such as barium titanate, lead zirconate titante and mixtures thereof.

These objects are achieved by providing a hot-pressing system for hot-pressing refractory powders into dense sintered bodies comprising a tunnel type furnace having a given temperature distribution therein, a plurality of die assemblies each of which has a refractory powder sandwiched between an upper punch and a lower punch thereof, a plurality of supporters for said plurality of dies, at least one pressing means which is positioned at a given position within said tunnel type furnace at a given temperature, and means for conveying said supporters intermittently one by one from an inlet of said tunnel type furnace through said at least one pressing means to an outlet of said tunnel type furnace, whereby the refractory powder in each of said die assemblies is hot-pressed into a dense sintered body by said at least one pressing means and the dense sintered bodies are conveyed to said outlet.

Other and further features and advantages of the invention will appear from the following description of a preferred embodiment thereof, taken in conjunction with the accompanying drawings.

DETAILED DESCRIPTION OF THE INVENTION

Figure 1:
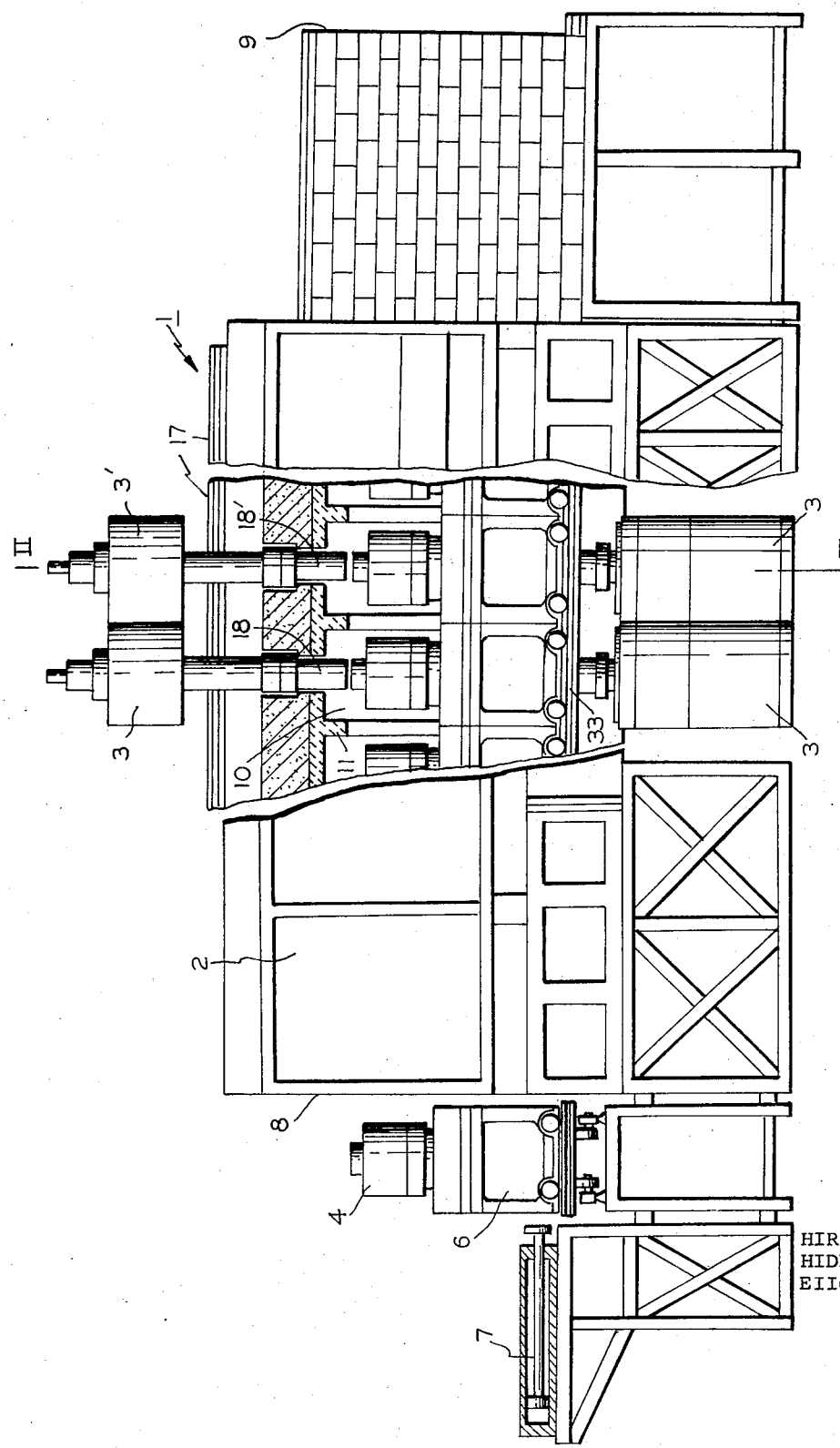
FIG. 1 is a side view partially in cross-section of a hot-pressing system according to the present invention.

Referring to FIG. 1 reference character 1 designates, as a whole, a hot-pressing system including a tunnel type furnace 2 which can be adjusted to have a desired temperature distribution therein. Pressing devices 3 and 3' are positioned at given positions of the tunnel type furnace 2, and are movable to various desired positions. A plurality of die assemblies 4, each of which has at least one type of refractory powder 5 inserted therein, are mounted on a plurality of supportors 6 and are intermittently pushed by a pusher 7 and conveyed one by one from an inlet 8 of the tunnel type furnace 2 through pressing devices 3 and 3' to an outlet 9 of the tunnel type furnace 2, The refractory powders 5 in each of the die assemblies 4 are hot-pressed into a dense sintered body by the pressing devices 3 and 3'. The dense sintered bodies are then conveyed to outlet 9 without pressure.

Figure 2:
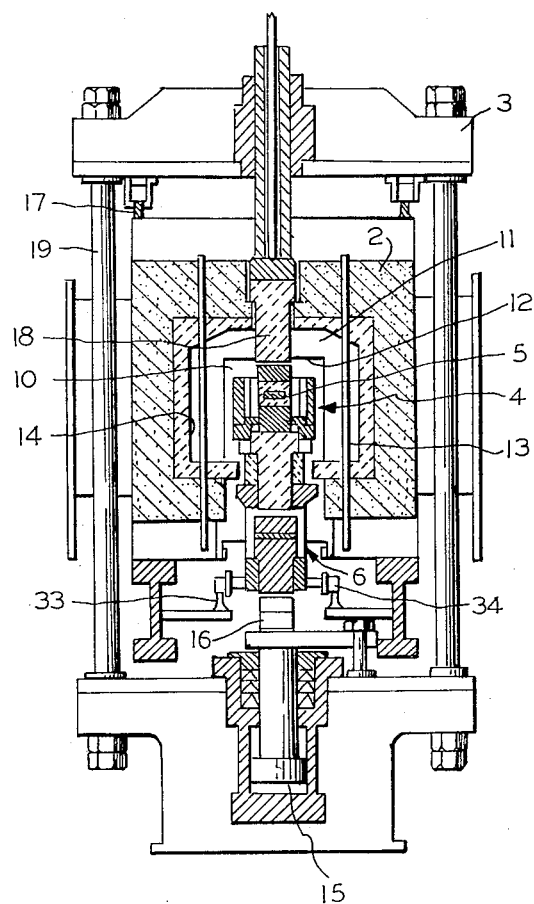
FIG. 2 is a cross-sectional view taken along line II—II of FIG. 1.

In accordance with the present invention the tunnel type furnace 2 is divided into a plurality of rooms 10 by heat insulating walls 11 each of which has a cut-off 12 to allow the die assemblies 4 on supporters 6 to pass therethrough as shown in FIGS. 1 and 2. Each of the plurality of rooms 10 have heaters 13 and heat reflecting plate 14 made of fire bricks. It is important that each of the plurality of rooms 10 have a given temperature and a substantially uniform temperature distribution therein, thus each of the rooms 10 tend to form separate temperature zones. Rooms 10 have a length substantially equal to each other along the length of travel of the plurality of supportors 6. The insulating walls 11 assure a homogeneous temperature distribution in each of the rooms 10.

According to the present invention the plurality of supporters 6 are substantially equal in length and also substantially equal to said length of rooms 10. Each of the supporters 6 is pushed by a pusher 7 and conveyed intermittently by a distance substantially equal to $n$-times the length of the rooms 10, n being an integer including one. After being conveyed by this distance, the supporters 6 stop for a given time period and are then conveyed further. Such movement is repeated throughout the furnace 22. It is important that each of the supporters 6 be located exactly in each room 10 and not be stopped across two of the rooms 10. Otherwise, the hot-pressing die assemblies 4 in which refractory powders are placed are heated unequally between the two adjacent rooms having different temperatures. This causes cracking of the die assemblies 4 and prevents the satisfactory hot-pressing of the refractory powders.

Referring to FIG. 2 the pressing device 3 comprises a hydraulic oil cylinder 15, a lower movable cylinder 16, an upper stationary cylinder 18, and a frame 19 and is installed in one of the rooms 10.

It is preferable that the pressing device 3 be easily moved to a desired room as desired according to the hot-pressing schedule. For this purpose tunnel type furnace 2 is provided at the top thereof with rails 17 along which the pressing device 3 is movable.

Depending on the hot-pressing schedule, the above mentioned at least one pressing means consists preferably and essentially of first pressing device 3 and a second pressing device 3', whereby the first pressing device 3 is positioned in a room of lower temperature than that of the second pressing device. It is desirable that the first pressing device 3 have an upper stationary cylinder 18 positioned at a lower level than an upper stationary cylinder 18' of the second pressing device. This arrangement prevents a collision of the upper stationary cylinder 18' with the upper punch of a die assembly when said die assembly is conveyed to a room where the pressing device is installed.

Figure 3:
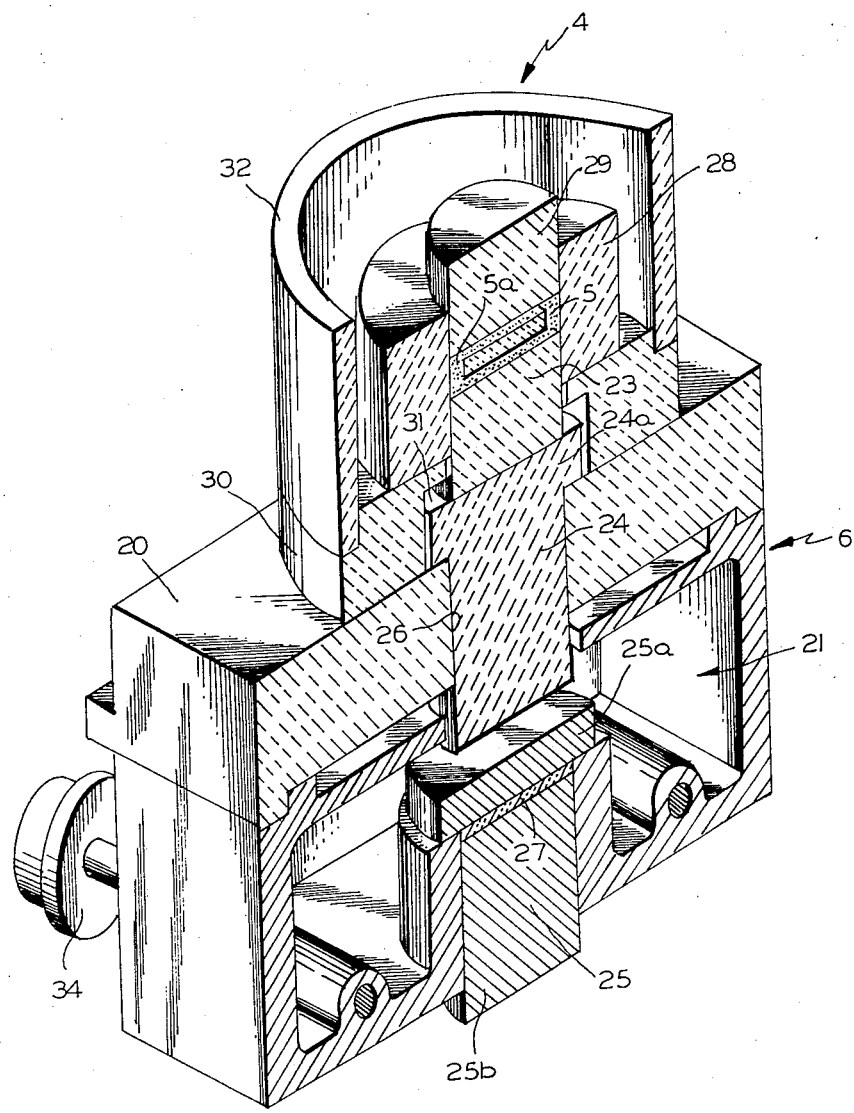
FIG. 3 is a perspective and cross-sectional view of a hot-pressing die assembly mounted on a supporter in accordance with the present invention.

Referring to FIG. 3, a die assembly 4 is mounted on a supporter 6 which has a heat insulating refractory plate 20 at the top thereof in order to prevent the heat from flowing to the bottom of supporter 6. Each of the supporters 6 has a movable refractory plunger 21 for transmitting a pressing force from pressing device 3 to the lower punch 23 of the die assembly 4. According to the present invention, the refractory plunger 21 consists essentially of two blocks 24 and 25. Block 24 is made of refractory material such as Sic, $Si_3N_4$ and mixtures thereof or $Al_2O_3$ and is movably inserted in a guide 26 provided in said heat insulating refractory plate 20. Block 24 has an upper flange 24a thereon which abuts the top surface of refractory plate 20. Block 25 is made of heat resistant material, such as heat-resisting steel, and has a heat insulating layer 27 made of material such as asbestos between the top portion 25a and the bottom portion 25b thereof. This insulating layer 27 prevents the heat from flowing to the lower portion of block 25.

Die assembly 4 comprises at least a die 28, a lower punch 23 and an upper punch 29 made of a refractory material. The refractory material must have a good heat conductivity and high mechanical strength at desired hot-press temperatures. Preferable materials for die assembly 4 are refractory oxides such as $Al_2O_3$, $ZrO_2$ or SiC, $Si_3N_4$ and mixtures thereof. According to the present invention die assembly 4 is placed on a holder 30 made of the above-mentioned preferable refractory material which is then positioned on the upper surface of refractory plate 20. Holder 30 has a hole 31 formed at the center thereof, through which lower punch 23 and the top portion of block 24 move without moving die 28 upon application of force from pressing device 3. Die assembly 4 is preferably surrounded by a refractory cylinder 32 made of a material having good heat conductivity to equalize the temperature distribution throughout the die assembly 4 and the refractory powder 5. It is preferable to use a material such as $Al_2O_3$ and SiC for cylinder 32.

Previously cold-pressed refractory powders 5 are placed in die 28 and sandwiched between lower punch 23 and upper punch 29. Refractory powders 5 are preferably enveloped with powder 5a of material such as $Al_2O_3$ and ZrO within die 28. This enveloping powder protects the refractory powders from a reaction with the die material. According to the present invention, supporters 6 have wheels 34 which are movable along rails 33 laid on the bottom of tunnel type furnace 2 by the action of pusher 7. Thus, the supporters 6 can be smoothly moved, even while carrying the heavy die assembly, holder, refractory plate and plunger.

The refractory powder 5 is conveyed into the room 10 having pressing device 3, and is hot-pressed. Specifically, lower movable cylinder 16 of pressing device 3 is moved upwardly by hydraulic oil cylinder 15 and thus lifts refractory plunger 21, which presses die assembly 4 having refractory powder 5 therein against upper stationary cylinder 18 for a desired time period while supporter 6 is stopped. After hot-pressing, lower movable cylinder 16 moves downwardly, and therefore, die assembly 4 is again moved downwardly onto holder 30. Thereafter, die assembly 4 on supporter 6 is conveyed to the next room 10 by means of pusher 7.

According to the present invention refractory powder 5 is preferably a molded powder of a ferromagnetic oxide or of a ferroelectric oxide such as ferrites, barium-titanate and lead-zirconate titanate.

In the case of a ferromagnetic or ferroelectric oxide material, a dense sintered body having a porosity lower than 0.5 percent is obtained by hot-pressing at a temperature ranging between 1000° C and 1500° C and a pressure higher than 50 kg/cm², regardless of the oxide composition. In this case, block 24, die 28, lower punch 23 and upper punch 29 are preferably made of SiC or $Si_3N_4$ or a mixture thereof, because these materials have a high mechanical strength at temperatures of from 1000° C to 1500° C. The refractory cylinder 32 and the holder 30 are also preferably made by SiC or $Si_3N_4$ or a mixture thereof, because these materials have high heat conductivity.

An example of a use of the system of the present invention is described as follows. This example is meant to be illustrative of a preferred use of the invention, and is not meant to limit the scope thereof.

Mixtures of 24 percent MnO, 24 percent ZnO, 52 percent $Fe_2O_3$, all percents being mole percents, where molded into discs each having a diameter of 150 mm and a thickness of 30 mm. These molded ferrite bodies were placed into a hot pressing die made of a mixture of SiC and $Si_3N_4$. The die had an outer diameter of 240 mm and an inner diameter of 160 mm and a height of 100 mm. The molded ferrite bodies were enveloped in $Al_2O_3$ powder in order to prevent a reaction of the ferrite with the die material and to press homogeneously throughout the molded ferrite body. The hot pressing system had two press devices which were installed at furnace rooms having temperatures of 1200° C and of 1350° C, respectively. The molded ferrite bodies were treated by the two stage hot-press process at conditions of 250 kg/cm² at 1200° C and 350 kg/cm² at 1350° C. The dies were conveyed intermittently into the next furnace room at an interval of 30 minutes.

The obtained ferrite bodies had a weight of about 1 kg, a porosity lower than 0.5 percent and an initial permeability of 20,000±2000 at 1 KHz. The ferrite bodies were composed of grains which were larger than 30μ.

What is claimed is:

1. A system for hot-pressing refractory powders into dense sintered bodies, said system comprising a tunnel type furnace having an inlet and an outlet and a given temperature distribution therein; a plurality of die assemblies, each of which has said refractory powders sandwiched between an upper punch thereof; a plurality of supporters for said plurality of die assemblies, each of said plurality of supporters having a refractory plate at the top thereof in order to prevent the bottom of said supporter from being heated and having a refractory plunger movably inserted in a guide thereof and extending through and abutting the top surface of said refractory plate, whereby a pressing force from said pressing means is transferred through said plunger to said lower punch; at least one pressing means which is positioned at a given position having a predetermined temperature within said tunnel type furnace; means for conveying said supporters intermittently one by one from said inlet, through said at least one pressing means to said outlet; whereby said refractory powders in each of said die assemblies are hot-pressed into a dense sintered body by said at least one pressing means and said dense sintered body is conveyed to said outlet.

2. A system as claimed in claim 1, wherein said plurality of supporters are substantially equal in length to each other along the path of travel through said furnace, and each of said supporters is conveyed intermittently by a distance substantially equal to $n$-times said length, $n$ being an integer including one.

3. A system as claimed in claim 2, wherein said tunnel type furnace is divided into a plurality of rooms by insulating walls, each of which has a cut-off to allow said die assemblies on said supporters to pass therethrough, said plurality of room having a length substantially similar to said length of said supporters.

4. A system for hot-pressing refractory powders into dense sintered bodies, said system comprising a tunnel type furnace having an inlet and an outlet and a given distribution of different temperature zones therein; a plurality of die assemblies, each of which has said refractory powders sandwiched between an upper punch and a lower punch thereof; a plurality of supporters for said plurality of die assemblies; at least one pressing means which is positioned at a given position having a predetermined temperature within said tunnel type furnace, said at least one pressing means comprising a first pressing device and a second pressing device, said first and second pressing devices being positioned within different temperature zones of said furnace.

5. A system as claimed in claim 4, wherein each of said pressing devices have upper stationary cylinders, said upper stationary cylinder of said first pressing device being positioned at a lower level than said second pressing device.

6. A system as claimed in claim 1, wherein said refractory plunger comprises two blocks, one of which is made of refractory material and the other of which is made of heat resistance material.

7. A system as claimed in claim 1, wherein each of said die assemblies includes a die, and further comprising a holder positioned on said top surface of each of said refractory plates, said holder having a hole formed at the center thereof, said die being positioned on said holder, whereby said lower punch and the top portion of said plunger move upwardly through said hole without moving said die upon application of pressure force from said pressing means.

8. A system as claimed in claim 1, wherein each of said plurality of die assemblies is surrounded by a refractory cylinder.

* * * * *